May 10, 1960 G. M. SKINNER 2,936,364
METAL ARC WORKING PROCESS AND APPARATUS
Filed Oct. 9, 1956
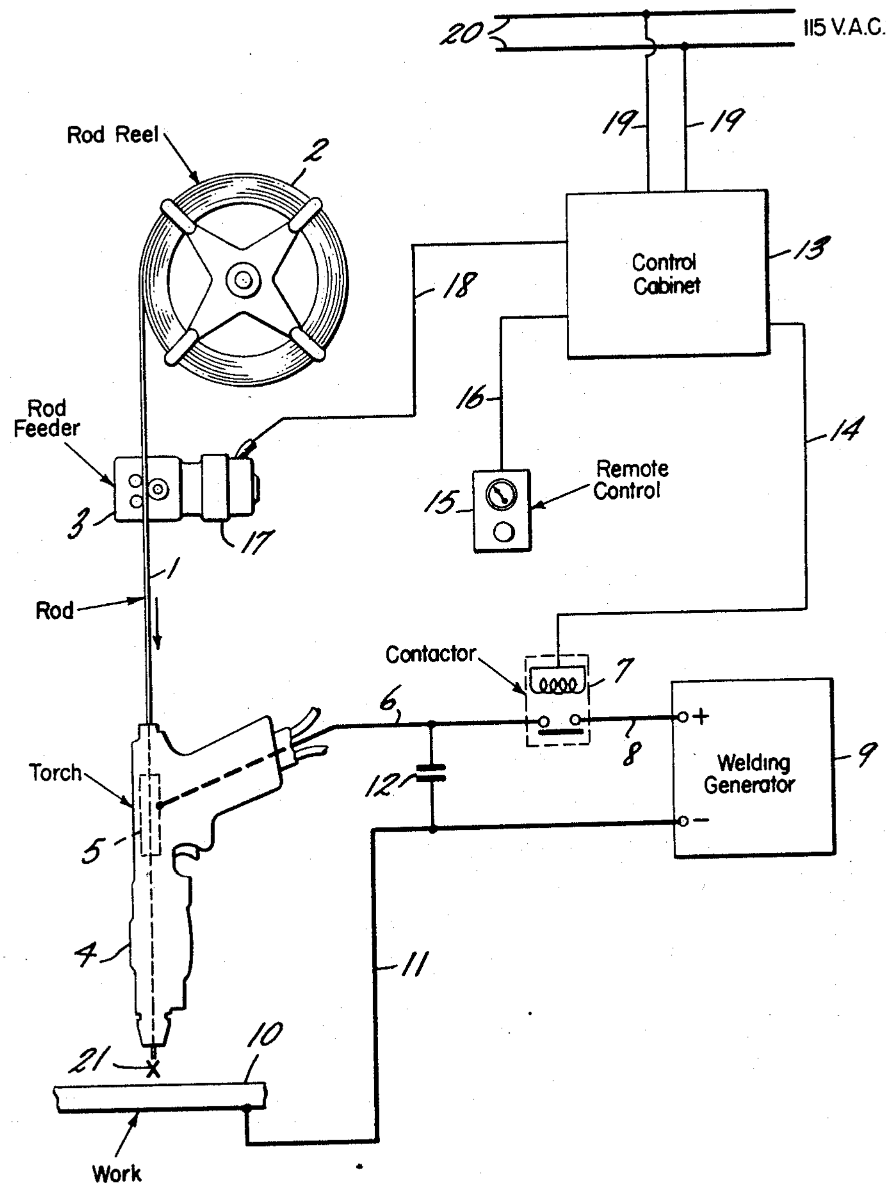
INVENTOR.
GEORGE M. SKINNER
BY
Barnwell R. King
ATTORNEY United States Patent Office 2,936,364

Patented May 10, 1960

2,936,364

METAL ARC WORKING PROCESS AND APPARATUS

George M. Skinner, Indianapolis, Ind., assignor to Union Carbide Corporation, a corporation of New York Application October 9, 1956, Serial No. 614,921

6 Claims. (Cl. 219—135)

This invention relates to metal arc working and more particularly to arc welding and cutting with a continuous consumable electrode and the work-in-circuit.

Sigma (shielded inert gas metal arc) welding as practiced, both manually and mechanized, has been handicapped by the two major problems of reliable starting and stable arc maintenance. The provision of auxiliary high frequency power has been used to provide a more stable arc initiation which does nothing to stabilize the arc once the welding action has begun. Stabilization of the arc during welding has been accomplished to a degree by selection of the shielding atmosphere and by the provision of constant potential generators.

We have discovered that the addition of capacitance in parallel with the ordinary direct current welding generator will serve to provide both the reliable starting of the arc plus the arc stabilization during welding. Thus the high frequency auxiliary voltage and the high cost constant potential generator are not required. Of course, the capacitor may be used in conjunction with a constant potential welding generator to further improve results.

This use of a condenser eliminates the need for high frequency arc initiation which is currently being objected to by the Federal Communications Commission. It also provides the benefits of constant potential power in that fluctuating arc length is compensated for by instantaneous current surges which change the melt-off rate and thus stabilize the arc.

In the drawing the single figure is a diagram illustrating the invention.

As shown a consumable electrode 1 in the form of rod or wire of selected metal is drawn from a reel 2 by a rod feeder 3 which delivers such rod to and through a torch 4 containing a contact member 5. Contact tube 5 is electrically connected by lead 6 to a contactor (relay) 7 which is, in turn, connected by conductor 8 to one pole (+) of a welding generator 9. The other pole (−) of the generator is connected to work 10 by a lead 11. A condenser 12 is connected across leads 6 and 11. The contactor 7 is operated by a control in a cabinet 13 through a cable 14. Such control is connected to a remote control in a portable box 15 by a cable 16, and to motor 17 of rod feeder 3 by a cable 18. Electric current is supplied to the control in cabinet 13 through lines 19 which are connected to a 115 volt A.C. supply circuit 20. A welding arc 21 is struck between the business end of the rod 1 and the work 10 in the operation of such apparatus. In use the addition of an electrolytic 0.04 farad condenser connected in parallel with a Rectarc welding generator gave more reliable starting and more stable welding arc characteristics in tests with 1/16" dia. #32 CMS welding wire using DCRP.

Arc starting has normally been accomplished by touching the electrode to the work then quickly withdrawing the electrode to the desired distance while maintaining the arc. During this stage of touch and start several things are known to happen. First the electrode is resistance welded to the work after which the local rod temperature rises rapidly, limited by the amount of current which can be supplied by the generator. This heating causes a burn-off of a section of the electrode which generally remains embedded in the weld. Following burn-off of the electrode tip the rod must be quickly adjusted to the optimum distance from the work in order to produce a good weld. During this period of establishment of the proper welding arc, a section of unsatisfactory weldment is produced which must be discarded.

The addition of suitable capacitors, according to this invention, serves to provide a very large current at the start-up which effects a much quicker burn-off of the shorted electrode with resultant establishment of the welding arc much more quickly. Also, during the period of adjusting the electrode to work distance following arc initiation the capacitors serve to remove the current surges from the welding circuit thereby quickly stabilizing the arc and reducing the amount of weldment which is unsatisfactory. Furthermore, while manual welding in difficult positions, it is extremely difficult for the operator to maintain the optimum arc length whereby the optimum current and voltages for producing a good weld is achieved. The ability of the capacitors to store and release the current under rapidly fluctuating arc length conditions should make this invention very desirable for manual welding.

Oscillographic records show that use of a 0.04 farad condenser in parallel with a 300-ampere Rectarc welding generator yielded a starting current surge of more than 1000 amperes with 1/16-in. diameter No. 32 CMS welding wire. When the condenser was omitted the starting current surge did not exceed 500 amperes. Under these conditions, reliable starting was experienced consistently with the condenser in the circuit. When the condenser was removed poor starting characteristics existed.

It is well known that the usual type of arc welding power supply has sufficiently poor regulation that the output voltage is materially influenced by the output current. As the current is increased the voltage is rapidly reduced. Also, the rate of filler wire melting is known to be dependent chiefly on welding current rather than on arc voltage. These welding generator characteristics tend to stabilize arc length when filler wire is delivered to the welding zone at a constant consumption rate. The addition of supplementary surge capacity further improves stability of arc length because the condenser would supply current to increase filler wire melting when the arc length and voltage become shorter than usual. Conversely the condenser would reduce the available current momentarily thereby reducing the rate of filler wire melting when arc length and arc voltage increase.

The selection of a 0.04 farad condenser for test welds with 1/16" dia. wire was done on the following basis. For arc starting the charging voltage is equal to the open circuit voltage of the power supply, which is from 70–100 volts for our power supplies. These are a Lincoln 600-ampere motor generator and a Westinghouse 300-ampere Rectarc. If all the condenser energy ($\frac{1}{2}$ CV.$^2$) is discharged through the short circuit and if the energy is to be 130 watt-seconds or that needed to melt off a 1/4-inch length of 1/16" diameter steel wire, thereby "breaking" the short circuit, then the capacitance needed is:

$$\frac{1}{2}\,CV.^2 = 130 \text{ joules (watt-seconds)}$$
$$C = 0.05 \text{ farad}$$

The test starts and short welds with argon shielding were done with both the Lincoln motor generator and the Westinghouse Rectarc units, with a 0.04 farad condenser across the terminals, using 1/16" diameter #32 CMS, aluminum, and stainless steel filler wire as shown in the following table.

*Part I*

| Weld Filler Rod | Operating | | Open Circuit Voltage | Capacitor |
|---|---|---|---|---|
| | Current | Voltage | | |
| 1/16"-32 CMS | 350 | 28 | 90 | In |
| 1/16"-32 CMS | 350 | 28 | 90 | Out |
| 1/16"-32 CMS | 320 | 28 | 55 | In |
| 1/16"-32 CMS | 320 | 28 | 55 | Out |
| 1/16" aluminum | 180 | 21 | 90 | In |
| 1/16" aluminum | 180 | 21 | 90 | Out |
| 1/16" aluminum | 180 | 21 | 55 | In |
| 1/16" aluminum | 180 | 21 | 55 | Out |
| 1/16" stainless | 280 | 29 | 90 | In |
| 1/16" stainless | 280 | 29 | 90 | Out |
| 1/16" stainless | 300 | 29 | 55 | In |
| 1/16" stainless | 300 | 29 | 55 | Out |

The above tests were done with the Lincoln Generator. The following tests were done with the Westinghouse Rectarc:

| Weld Filler Rod | Current | Voltage | Open Circuit Voltage | Capacitor |
|---|---|---|---|---|
| 1/16"-32 CMS | 360 | 28 | 70 | In |
| 1/16"-32 CMS | 360 | 28 | 70 | Out |

*Part II*

| Weld Filler Rod | Current Surge[1] On Starting, Amp. | | Reliability[2] of Start |
|---|---|---|---|
| | From Condenser | From Generator | |
| 1/16"-32 CMS | 1700 | 1380 | Excellent |
| 1/16"-32 CMS | | 1280 | Fair |
| 1/16"-32 CMS | 700-870 | 1400 | Fair |
| 1/16"-32 CMS | | 1320 | Fair |
| 1/16" aluminum | 2150 | 450 | Good |
| 1/16" aluminum | | 480 | None |
| 1/16" aluminum | 540-720 | 430 | None |
| 1/16" aluminum | | 470 | None |
| 1/16" stainless | 1050-1480 | 1010 | Excellent |
| 1/16" stainless | | 1010 | Fair |
| 1/16" stainless | 700-1100 | 1050 | Fair |
| 1/16" stainless | | 1120 | Fair |

NOTES: [1] Current surge determined from oscillographic record.

[2] The reliability of the start was determined on several, 6 to 8, tests made for each set of conditions. With #32 CMS and stainless steel an arc was eventually established under all recorded conditions while with aluminum, starts were obtained only with the capacitor in.

The above tests were done with the Lincoln Generator. The following tests were done with the Westinghouse Rectarc:

| Weld Filler Rod | From Condenser | From Generator | Reliability of Start |
|---|---|---|---|
| 1/16"-32 CMS | 1200 | 500 | Excellent |
| 1/16"-32 CMS | | 500 | Fair |

The data show that an open circuit voltage of 55 did not charge the capacitor sufficiently for 100% reliability but that 90 volts was very effective for all rod materials tested. Moreover, when aluminum rod was used the condensers eliminated the need for drastic reduction of rod feed rate, as is required to permit arc initiation when condensers are not used.

The invention is applicable to straight polarity (electrode negative) as well as to reverse polarity (electrode positive), and to sigma cutting as well as welding.

What is claimed is:

1. Direct current welding and cutting apparatus comprising a torch containing a contact member, means for feeding a consumable metal electrode by and in contact with said contact member, and means including leads for connecting said contact member and the work to a D.C. source of welding power, in combination with a surge current condenser having a capacity of the order of 0.04–0.05 farads connected across said leads for assisting starting of an arc between the business end of such electrode and the work and for stabilizing such arc.

2. Process of direct current arc welding which comprises connecting a surge current condenser having a capacity of the order of 0.04–0.05 farads across the poles of a D.C. source of power prior to and during the welding operation for the purpose of supplying a surge current which assists starting of a welding arc between a consumable metal electrode and the work to be welded and also supplying current surges as needed for stabilizing the operation.

3. Process of welding as defined by claim 2, in which the electrode is metal selected from the class consisting of aluminum, stainless steel, and carbon steel.

4. A power source for electric arc working such as welding and cutting, which comprises a direct current output circuit having a positive side and a negative side adapted to be connected to the arc circuit, in combination with a surge current condenser having a capacity of the order of 0.04–0.05 farads connected across such positive and negative sides of said output circuit for supplying a starting current surge to such arc circuit as well as arc stabilizing current surges during operation of the arc.

5. Process of direct current consumable electrode welding which comprises connecting between the arc electrodes a D.C. power source, supplying surge current for assisting in arc initiation by means of a surge current condenser connected across the poles of said power source, and stabilizing the arc and controlling the electrode melt-off rate by supplying current surges from said condenser during welding.

6. In a direct current arc system including a direct current source of supply having positive and negative poles, the combination of a surge current condenser connected directly across such positive and negative poles of said direct current supply source for providing current surges during arc initiation and for stabilizing the resulting arc.

References Cited in the file of this patent

UNITED STATES PATENTS

| | | |
|---|---|---|
| 1,685,082 | Green | Sept. 25, 1928 |
| 2,045,801 | Richter | June 30, 1936 |
| 2,365,612 | White | Dec. 19, 1944 |
| 2,504,868 | Muller et al. | Apr. 18, 1950 |
| 2,773,170 | Barthel | Dec. 4, 1956 |
| 2,776,361 | Essig | Jan. 1, 1957 |